US008891469B2

(12) United States Patent
Nishio et al.

(10) Patent No.: US 8,891,469 B2
(45) Date of Patent: Nov. 18, 2014

(54) RADIO TRANSMITTING APPARATUS AND CONTROL SIGNAL TRANSMITTING METHOD

(75) Inventors: Akihiko Nishio, Kanagawa (JP); Seigo Nakao, Kanagawa (JP); Christian Wengerter, Germany (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 254 days.

(21) Appl. No.: 13/512,756

(22) PCT Filed: Dec. 16, 2010

(86) PCT No.: PCT/JP2010/007305
§ 371 (c)(1),
(2), (4) Date: May 30, 2012

(87) PCT Pub. No.: WO2011/074265
PCT Pub. Date: Jun. 23, 2011

(65) Prior Publication Data
US 2012/0236814 A1 Sep. 20, 2012

(30) Foreign Application Priority Data
Dec. 17, 2009 (JP) ................................. 2009-286655

(51) Int. Cl.
*H04W 4/00* (2009.01)
*H04L 5/00* (2006.01)
*H04W 88/08* (2009.01)
*H04B 7/04* (2006.01)
*H04B 7/02* (2006.01)

(52) U.S. Cl.
CPC ............ *H04L 5/0092* (2013.01); *H04L 5/0057* (2013.01); *H04W 88/08* (2013.01); *H04L 5/001* (2013.01); *H04B 7/0413* (2013.01); *H04L 5/0023* (2013.01); *H04L 5/0035* (2013.01); *H04B 7/024* (2013.01)
USPC ........................................................ 370/329

(58) Field of Classification Search
None
See application file for complete search history.

(56) References Cited

U.S. PATENT DOCUMENTS

2009/0088148 A1* 4/2009 Chung et al. .................. 455/423
2010/0157927 A1 6/2010 Mochizuki et al.
(Continued)

FOREIGN PATENT DOCUMENTS

WO 2009/001594 A1 12/2008
WO 2009/057283 A1 5/2009
WO 2009/074611 A2 6/2009

OTHER PUBLICATIONS

International Search Report for PCT/JP2010/007305 dated Feb. 22, 2011.
(Continued)

*Primary Examiner* — Anh-Vu Ly
*Assistant Examiner* — Gustavo Lopez-Vargas
(74) *Attorney, Agent, or Firm* — Pearne & Gordon LLP

(57) ABSTRACT

Provided are a radio transmitting apparatus and a control signal transmitting method whereby the number of blind decodings on a control signal receiving side can be reduced without increasing the control signal allocation block rate. In a base station (100), a search space establishing unit (103) establishes two subsets into which a UE-SS established in a second transmission mode different from a first transmission mode has been divided and the number of which is the same as the number of the sub-modes of the first transmission mode, and an allocating unit (106) allocates the mutually different subsets to those two respective sub-modes. Each subset has a plurality of downstream control information allocation area candidates. In this way, the blind decoding area candidates related to DCI format corresponding to each sub-mode can be limited to the subset corresponding to each sub-mode.

7 Claims, 9 Drawing Sheets

(56) References Cited

U.S. PATENT DOCUMENTS

| | | | |
|---|---|---|---|
| 2010/0260124 A1 | 10/2010 | Noshio et al. | |
| 2010/0279628 A1* | 11/2010 | Love et al. | 455/70 |
| 2010/0302983 A1* | 12/2010 | McBeath et al. | 370/311 |
| 2011/0070845 A1* | 3/2011 | Chen et al. | 455/91 |
| 2011/0076962 A1* | 3/2011 | Chen et al. | 455/68 |
| 2011/0080888 A1* | 4/2011 | Lee et al. | 370/329 |
| 2011/0103509 A1* | 5/2011 | Chen et al. | 375/295 |
| 2011/0182385 A1* | 7/2011 | Doan et al. | 375/340 |
| 2011/0243090 A1* | 10/2011 | Grovlen et al. | 370/329 |
| 2011/0255485 A1* | 10/2011 | Chen et al. | 370/329 |
| 2011/0310856 A1* | 12/2011 | Hariharan et al. | 370/336 |
| 2012/0051306 A1* | 3/2012 | Chung et al. | 370/329 |
| 2012/0063350 A1* | 3/2012 | Kim et al. | 370/252 |

OTHER PUBLICATIONS

3GPP TS 36.211 V8.7.0, "Physical Channels and Modulation (Release 8)," Sep. 2008.

3GPP TS 36.212 V8.7.0, "Multiplexing and channel coding (Release 8)," Sep. 2008.

3GPP TS 36.213 V8.7.0, "Physical layer procedures (Release 8)," Sep. 2008.

3GPP TSG RAN WG1 meeting, R1-094513, "DL Multi-antenna operation image" Jun. 2009.

Panasonic, DCI format and blind decoding for LTE-Advanced, 3GPP TSG-RAN TSG WG1 Meeting #59 R1-094497, 3GPP, Nov. 9, 2009, p. 1-5.

Office Action issued in Chinese Patent Application No. 201080052881 dated Apr. 24, 2014.

3GPP TSG-RAN WG1 meeting #59 "PDCCH designing issues for LTE-A" Nov. 9, 2009.

* cited by examiner

| PDCCH SIZE | 5MHz | | | | | 10MHz | | | | | 20MHz | | | | |
|---|---|---|---|---|---|---|---|---|---|---|---|---|---|---|---|
| | Bits | 1-CCE | 2-CCE | 4-CCE | 8-CCE | Bits | 1-CCE | 2-CCE | 4-CCE | 8-CCE | Bits | 1-CCE | 2-CCE | 4-CCE | 8-CCE |
| SINGLE-RANK DCI | 43 | 0.60 | 0.30 | 0.15 | 0.07 | 45 | 0.63 | 0.31 | 0.16 | 0.08 | 46 | 0.64 | 0.32 | 0.16 | 0.08 |
| SUPERSET DCI (2TX) | 54 | 0.75 | 0.38 | 0.19 | 0.09 | 59 | 0.82 | 0.41 | 0.20 | 0.10 | 66 | 0.92 | 0.46 | 0.23 | 0.11 |
| SUPERSET DCI (4TX) | 56 | 0.78 | 0.39 | 0.19 | 0.10 | 60 | 0.83 | 0.42 | 0.21 | 0.10 | 68 | 0.94 | 0.47 | 0.24 | 0.12 |

FIG. 7

RADIO TRANSMITTING APPARATUS AND CONTROL SIGNAL TRANSMITTING METHOD

TECHNICAL FIELD

The present invention relates to a radio transmitting apparatus and a control signal transmission method.

BACKGROUND ART

3GPP-LTE (3rd Generation Partnership Project Radio Access Network Long Term Evolution (hereinafter, referred to as "LTE")) adopts OFDMA (Orthogonal Frequency Division Multiple Access) as a downlink communication scheme, and SC-FDMA (Single Carrier Frequency Division Multiple Access) as an uplink communication scheme (for example, see Non-Patent Literatures 1, 2 and 3).

With LTE, a radio communication base station apparatus (hereinafter abbreviated as "base station") communicates with a radio communication terminal apparatus (hereinafter abbreviated as "terminal") by allocating resource blocks (RBs) in a system band to terminals, per time unit referred to as "subframe."

A base station also transmits, to terminals, downlink control information (L1/L2 control information) to notify the result of resource allocation for downlink data and uplink data. This downlink control information is transmitted to terminals using downlink control channels such as PDCCHs (Physical Downlink Control Channels). Here, each PDCCH occupies a resource comprised of one or more consecutive CCEs (Control Channel Elements). In LTE, the number of CCEs (CCE aggregation level) occupied by a PDCCH selects one of 1, 2, 4, and 8, according to the number of information bits of downlink control information or the condition of the propagation paths of terminals. Here, LTE supports a frequency band having a maximum width of 20 MHz as the system bandwidth.

In addition, when allocating a plurality of terminals to one subframe, a base station transmits a plurality of PDCCHs at the same time. At this time, the base station transmits a PDCCH including CRC bits masked (or scrambled) with a destination terminal ID to identify each PDCCH destination terminal. Then, a terminal performs blind decoding on a plurality of PDCCHs that may be directed to the terminal by demasking (or descrambling) CRC bits with the terminal ID of the terminal to detect the PDCCH directed to the terminal.

Downlink control information transmitted from a base station is referred to as "DCI," and DCI includes such as resource information (resource allocation information) allocated from a base station to a terminal and MCS (Modulation and channel Coding Scheme). DCI includes a plurality of formats. That is, a plurality of formats mean an uplink format, a format for downlink MIMO (Multiple Input Multiple Output) transmission, a format for downlink discontinuous band allocation, or the like. A terminal needs to receive both downlink allocation control information (allocation control information on downlink) and uplink allocation control information (allocation control information on uplink). The downlink allocation control information includes a plurality of formats (downlink allocation control information formats), and the uplink allocation control information includes one format (an uplink allocation control information format).

For example, in the downlink control information (DCI), formats having a plurality of sizes are defined according to a transmitting antenna control method and resource allocation method or the like in a base station. Among this plurality of formats, the size of a downlink allocation control information format (hereinafter, referred to as "continuous band allocation downlink format") performing continuous band allocation is the same as that of an uplink allocation control information format (hereinafter, simply referred to as "continuous band allocation uplink format") performing continuous band allocation. These formats (DCI formats) include type information (for example, a flag of one bit) indicating a type of allocation control information (downlink allocation control information or uplink allocation control information). Therefore, by checking the type information included in the allocation control information, a terminal can specify whether the allocation control information is downlink allocation control information or uplink allocation control information, even when the size of continuous band allocation downlink format is the same as that of continuous band allocation uplink format.

The continuous band allocation downlink format is referred to as "DCI format 0 (hereinafter, referred to as "DCI 0")," and the continuous band allocation uplink format is referred to as "DCI format 1A (hereinafter, referred to as "DCI 1A")." As described above, DCI 0 and DCI 1A are the same size and can be distinguished according to the type information. Therefore, in the following explanation, DCI 0 and DCI 1A are represented together as "DCI 0/1A."

Other than a continuous band allocation downlink format and a continuous band allocation uplink format, the DCI formats includes a downlink allocation control information format ("discontinuous band allocation downlink format": DCI format 1: DCI 1) performing discontinuous band allocation, a downlink allocation control information format ("spatial multiplexing MEMO downlink format": DCI formats 2 and 2A: DCIs 2 and 2A) allocating spatial multiplexing MIMO transmission and the like. Here, DCIs 1, 2, and 2A are the formats used depending on a downlink transmission mode (discontinuous band allocation or spatial multiplexing MIMO transmission) of a terminal. That is, DCIs 1, 2, and 2A are the formats set for each terminal. Meanwhile, DCI 0/1A is the format not depending on a transmission mode and used for a terminal of any transmission mode. That is, DCI 0/1A is the format commonly used for all terminals. When DCI 0/1A is used, one antenna transmission or transmit diversity is used as a default transmission mode.

Also, a method of limiting the CCEs subject to blind decoding on a per terminal basis has been studied to reduce the number of blind decoding attempts in order to reduce a circuit scale of a terminal. In this method, a CCE region (hereinafter, referred to as "search space") that may be subject to blind decoding by each terminal is limited. Here, a unit of a CCE region allocated to each terminal (that is, equivalent to a unit to perform blind decoding) is referred to as "downlink control information allocation region candidate (PDCCH allocation region candidate)" or "blind decoding region candidate."

In LTE, a search space is randomly set for each terminal. The number of CCEs forming this search space is defined per a CCE aggregation level of PDCCH. For example, the numbers of CCEs forming a search space become 6, 12, 8, and 16, associated with the CCE aggregation levels of PDCCHs 1, 2, 4, and 8, respectively. In this case, the numbers of blind decoding region candidates become six candidates (6=6÷1), six candidates (6=12÷2), two candidates (2=8÷4), and two candidates (2=16÷8), associated with the CCE aggregation levels of PDCCHs 1, 2, 4, and 8, respectively. That is, the blind decoding region candidate is limited to sixteen candidates in total. By this means, each terminal needs to perform blind decoding only for a blind decoding region candidate group in a search space allocated to the terminal, and therefore can reduce the number of blind decoding attempts. Here, the search space of each terminal is set using a terminal ID of each terminal and a hash function that is a function to perform randomization. This terminal-specific CCE region is referred to as "UE specific search space (UE-SS)."

On the other hand, PDCCH also includes control information (for example, allocation information of a downlink broadcast signal and allocation information of a paging signal) (hereinafter, referred to as "control information for common channel") that is reported to a plurality of terminals at the same time and is used for data allocation common to all terminals. In order to transmit control information for common channel, a CCE region (hereinafter, referred to as "common search space (C-SS)") that is common to all terminals that should receive a downlink broadcast signal is used for PDCCH. Four blind decoding region candidates (4=16÷4) and two blind decoding region candidates (2=16÷8), with respect to CCE aggregation levels 4 and 8 respectively, that is, in total, only six blind decoding region candidates exist in a search space of C-SS.

In UE-SS, a terminal performs blind decoding for two sizes of DCI formats, such as a first kind of DCI format (DCI 0/1A) commonly used for all terminals and a second kind of DCI format (such as DCIs 1, 2, and 2A) depending on a transmission mode. For example, since in UE-SS the terminal performs blind decoding on sixteen blind decoding region candidates with respect to both the first kind of DCI format (DCI 0/1A) and the second kind of DCI format (such as DCIs 1, 2, and 2A) having different sizes, the terminal performs blind decoding thirty-two times in total.

Also, since in C-SS a terminal performs blind decoding on six blind decoding region candidates with respect to DCI 1A and DCI format 1C (hereinafter, referred to as "DCI 1C") that is a format used for common channel assignment, the terminal performs blind decoding twelve times in total.

Here, DCI 1A used for common channel allocation and DCI 0/1A used for data allocation of an individual terminal are the same size but are distinguished each other by a terminal ID. Therefore, also in C-SS, a base station can transmit DCI 0/1A performing data allocation of an individual terminal, without increasing the number of blind decoding attempts in a terminal.

Also, the standardization of 3GPP LTE-advanced, (hereinafter referred to as "LTE-A") which realizes much faster communication than LTE, has been started. LTE-A realizes a downlink transmission speed equal to or higher than the maximum 1 Gbps and an uplink transmission speed equal to or higher than the maximum 500 Mbps. For this reason, it is expected to adopt a base station and a terminal (hereinafter "LTE-A terminal") that are capable of communication at a wideband frequency equal to or higher than 40 MHz. In addition, an LTE-Advanced system is required to accommodate not only LTE-A terminals but also terminals (hereinafter "LTE terminals") supporting an LTE system.

In LTE-A, studies are underway to introduce MIMO transmission having up to eight antennas, in addition to MIMO transmission having up to four antennas supported by LTE. Also, studies are underway to introduce CoMP transmission designed to improve throughput of terminals of a cell edge. In CoMP transmission, joint processing and coordinated scheduling are reviewed. The joint processing is the technique such that a plurality of base stations transmit a signal in a coordinated manner to make a terminal receive a signal with stronger power. The coordinated scheduling is the technique that a plurality of base stations reduce interference exerted on a terminal in a coordinated manner. That is, in CoMP, it is possible to perform MIMO transmission assuming a plurality of base stations as a transmitting point. In CoMP, SU-MIMO spatially multiplexing for one terminal and MU-MIMO spatially multiplexing for a plurality of terminals are possible.

In LTE-A, as a DCI format commonly used in MIMO and CoMP transmissions, studies are underway to define two different formats such as a format capable of reporting spatial multiplexing transmission of Rank 2 or more and a format capable of reporting spatial multiplexing transmission of only Rank 1 (for example, see Non-Patent Literature 4).

CITATION LIST

Non-Patent Literature

NPL 1
3GPP TS 36.211 V8.7.0, "Physical Channels and Modulation (Release 8)," September 2008
NPL 2
3GPP TS 36.212 V8.7.0, "Multiplexing and channel coding (Release 8)," September 2008
NPL 3
3GPP TS 36.213 V8.7.0, "Physical layer procedures (Release 8)," September 2008
NPL 4
3GPP TSG RAN WG1 meeting, R1-094513, "DL Multi-antenna operation image" June 2009

SUMMARY OF INVENTION

Technical Problem

Here, in the case of spatial multiplexing transmission of Rank 2 or more, transmission parameters such as a MCS level or HARQ information with respect to two transport blocks (data blocks) need to be reported. Therefore, a DCI format (hereinafter, described as "format 2C") capable of reporting spatial multiplexing transmission of Rank 2 or more has large overhead.

Meanwhile, in Rank 1 transmission, only transmission parameter with respect to one transport block may be reported. Therefore, a DCI format (hereinafter, described as "format 2D") capable of reporting only Rank 1 has small overhead.

Here, it is possible to dynamically switch these two DCI formats (that is, format 2C and format 2D) that are commonly defined for MIMO and CoMP transmissions in a subframe unit. In this case, since switching a transmission mode (or, a DCI format subject to monitoring) by signaling in a higher layer (RRC signaling) is not necessary, thereby enabling to reduce control overhead and simplify base station processing.

However, in order to make it possible to dynamically switch two DCI formats, it is necessary to monitor, at the same time, two DCI formats where a terminal depends on a transmission mode. That is, in UE-SS a terminal needs to perform blind decoding further sixteen times, and therefore the terminal needs to perform blind decoding forty-eight times in total. This leads to the increases of terminal complexity and terminal consumption power.

Also, increasing the number of blind decoding attempts increases a false alarm rate detecting PDCCH erroneously. By this means, the increase of interference and the HARQ combination of wrong data results in the increase of retransmission in a higher layer, and therefore there may be a risk to deteriorate system throughput.

By contrast, in order to reduce the number of blind decoding attempts, it is also possible to uniformly reduce a search space for each DCI format, for example, reducing to ten blind decoding region candidates in total. However, since uniformly reducing such a search space causing a higher possibility to generate contention among terminals, therefore, even when a base station attempts to allocate PDCCH to a certain terminal, a rate that blocks the allocation (that is, a block rate) becomes higher.

In view of the above, it is an object of the present invention to provide a radio transmitting apparatus and a control signal transmission method capable of reducing the number of blind decoding attempts at a receiving side without increasing an allocation block rate of a control signal.

Solution to Problem

A radio transmitting apparatus of the present invention is the apparatus to transmit a control signal by arranging the control signal in one allocation region candidate of a plurality of allocation region candidates provided in a search space, the radio transmitting apparatus includes: a search space setting section for setting a plurality of subsets having a divided search space, the search space set in a second transmission mode other than a first transmission mode and set individually to each receiving apparatus; and an allocation section for allocating a plurality of different subsets to a plurality of submodes provided in the first transmission mode.

A control signal transmission method of the present invention is the method to transmit a control signal by arranging the control signal in one allocation region candidate of a plurality of allocation region candidates provided in a search space, the control signal transmission method includes: setting a plurality of subsets having a divided search space, the search space set in a second transmission mode other than a first transmission mode and set individually to each receiving apparatus; and allocating the plurality of different subsets to a plurality of submodes provided in the first transmission mode.

Advantageous Effects of Invention

The present invention can provide a radio transmitting apparatus and a control signal transmission method capable of reducing the number of blind decoding attempts at a receiving side without increasing an allocation block rate of a control signal.

BRIEF DESCRIPTION OF DRAWINGS

FIG. 7 shows coding rates associated with CCE aggregation levels to DCI format 2C and DCI format 2D (two and four antennas);

DESCRIPTION OF EMBODIMENTS

Figure 1:
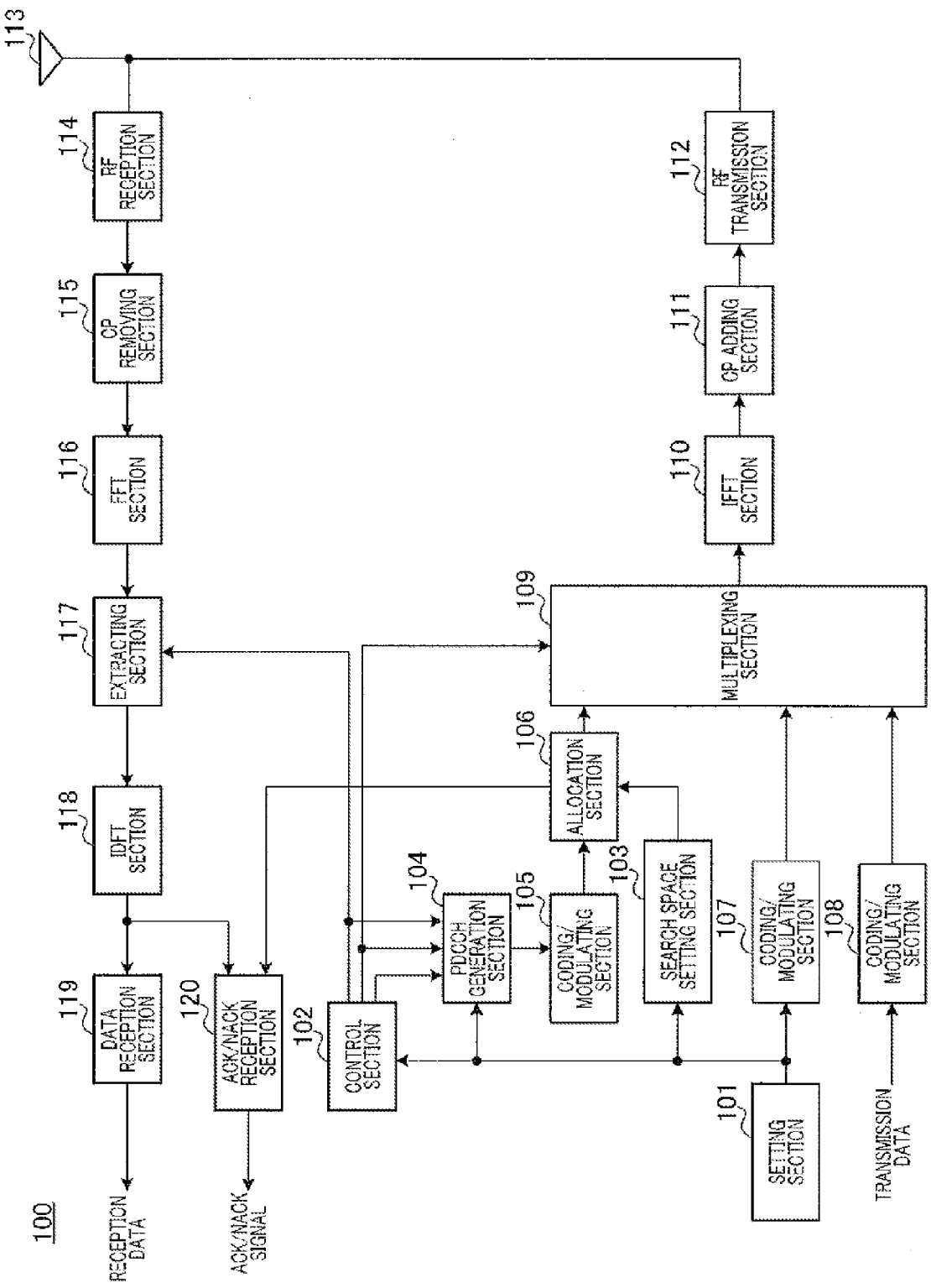
FIG. 1 is a block diagram showing a configuration of a base station according to embodiment 1 of the present invention.

Now, an embodiment of the present invention will be explained in detail with reference to the accompanying drawings. Here, in embodiments, the same components will be allocated the same reference numerals and their explanations will be omitted.

(Embodiment 1)
[Base Station Configuration]

FIG. 1 is a block diagram showing a configuration of base station 100 according to the present embodiment. Hereinafter, base station 100 is explained as an LTE-A base station.

In FIG. 1, base station 100 includes setting section 101, control section 102, search space setting section 103, PDCCH generating section 104, coding/modulating sections 105, 107, and 108, allocation section 106, multiplexing section 109, IFFT (Inverse Fast Fourier Transform) section 110, CP (Cyclic Prefix) adding section 111, RF transmission section 112, antenna 113, RF reception section 114, CP removing section 115, FFT (Fast Fourier Transform) section 116, extracting section 117, IDFT (Inverse Discrete Fourier Transform) section 118, data reception section 119, and ACK/NACK reception section 120.

Setting section 101 sets an uplink transmission mode and a downlink transmission mode in communication between terminals as a setting target, based on terminal transmission/reception ability (UE capability) of the terminals as a setting target or the condition of the propagation paths. This transmission mode setting is performed for each terminal as a setting target.

This transmission mode includes, for example, a transmission mode according to transmit diversity defined in LTE, a transmission mode according to spatial multiplexing MIMO, a transmission mode according to Rank 1 precoding, a MU-MIMO transmission mode, a beam forming transmission mode, and a "multi-antenna transmission mode" as a transmission mode common to MIMO and CoMP transmissions for an LTE-A terminal. An uplink transmission mode also includes a MIMO transmission mode and a transmission mode according to discontinuous band allocation.

Setting section 101 includes transmission mode information indicating a transmission mode set at the terminal as a setting target, into setting information, and outputs the setting information to control section 102, search space setting section 103, PDCCH generating section 104 and coding/modulating section 107. This setting information is reported to each terminal via coding/modulating section 107, as the control information of a higher layer (RRC control information).

Control section 102 generates allocation control information (DCI), according to transmission mode information included in the setting information received from setting section 101. This DCI is generated per allocation target terminal.

With respect to a terminal of a transmit diversity mode, control section 102 generates the MCS information to one transport block, resource (RB) allocation information, and allocation control information including HARQ information, using DCI format 1.

With respect to a terminal of "multi-antenna transmission mode," control section 102 generates allocation control information, using one DCI format selected from two DCI formats depending on transmission modes. This two DCI formats mean a DCI format capable of reporting spatial multiplexing transmission of Rank 2 or more (that is, DCI format 2C (superset DCI)) and a DCI format capable of reporting spatial multiplexing transmission of only Rank 1 (that is, DCI format 2D (single rank DCI)). This selection method will be described later.

Here, allocation control information generated by control section 102 includes uplink allocation control information indicating uplink resource (e.g. PUSCH (Physical Uplink Shared Channel)) to allocate uplink data of a terminal, and downlink allocation control information indicating downlink resource (e.g. PDSCH (Physical Downlink Shared Channel)) to allocate downlink data directed to a terminal.

Control section 102 may use allocation control information (DCI 0/1A) common to all terminals, other than allocation control information according to a transmission mode per terminal as described above.

For example, during a normal data transmission, control section 102 generates allocation control information, using formats (DCIs 1, 2, 2A, 2B, 2C, 2D, 0A, and 0B) according to a transmission mode of each terminal. By this means, since it is possible to perform data transmission with a transmission mode set to each terminal, therefore, throughput can be improved.

However, rapid change of the condition of the propagation paths or change of interference from adjacent cells or the like may cause frequent reception error in a transmission mode set to each terminal. In this case, control section 102 generates allocation control information by a format (DCI 0/1A) common to all terminals (that is, a format of a default transmission mode). By this means, it is possible to perform further robust transmission.

Other than allocation control information for data allocation of an individual terminal, control section 102 also generates allocation control information by a format (for example, DCIs 1C and 1A) for a common channel. The allocation control information for a common channel is used to allocate data such as broadcast information and paging information that are common to a plurality of terminals.

In the generated allocation control information for data allocation of an individual terminal, control section 102 outputs MCS information and HARQ information to PDCCH generating section 104, uplink resource allocation information to PDCCH generating section 104 and extracting section 117, and downlink resource allocation information to PDCCH generating section 104 and multiplexing section 109. Control section 102 also outputs the generated allocation control information for a common channel to PDCCH generating section 104.

Search space setting section 103 sets a common search space (C-SS) and a UE specific search space (UE-SS). As described above, a common search space (C-SS) is the search space common to all terminals, and a UE specific search space (UE-SS) is the search space dedicated to each terminal.

Specifically, search space setting section 103 sets the preliminarily set CCEs (for example, 16 CCEs from the first CCE) as C-SS. The CCE serves as a standard unit.

Meanwhile, search space setting section 103 sets UE-SS for each terminal. For example, search space setting section 103 calculates UE-SS of a certain terminal, from a CCE number calculated using a terminal ID of the terminal and a hash function to perform randomization, and the number of CCEs (L) forming a search space.

Figure 2:
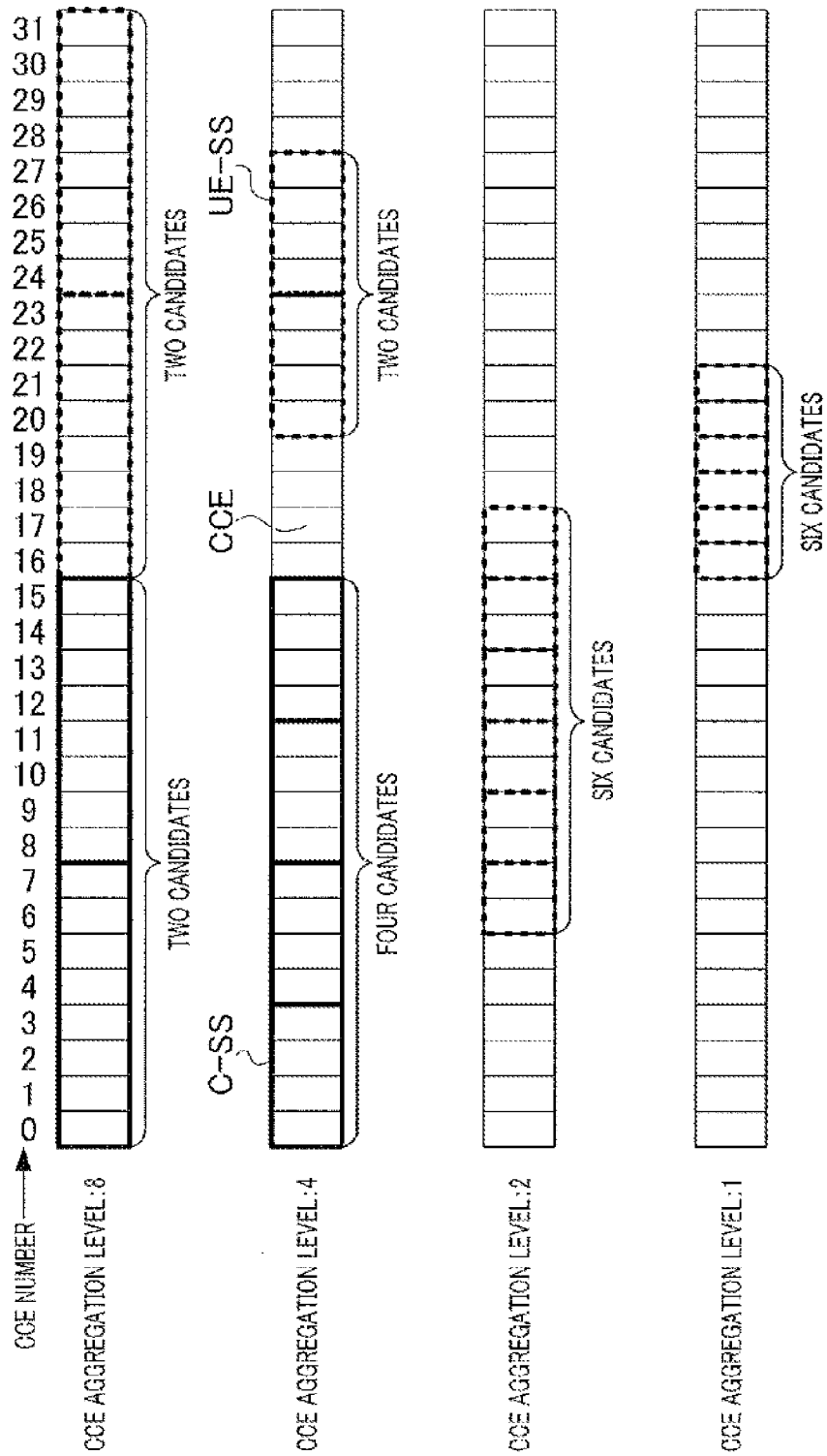
FIG. 2 shows UE-SS configuration examples for a certain terminal and C-SS configuration examples.

FIG. 2 shows UE-SS configuration examples for a certain terminal and C-SS configuration examples.

In FIG. 2, in the case of CCE aggregation level 4 of PDCCH, four PDCCH allocation region candidates (that is, CCE 0 to 3, CCE 4 to 7, CCE 8 to 11, and CCE 12 to 15) are set as C-SS. In the case of CCE aggregation level 8 of PDCCH, two PDCCH allocation region candidates (that is, CCE 0 to 7 and CCE 8 to 15) are set as C-SS. That is, in FIG. 2, a total of six PDCCH allocation region candidates are set as C-SS.

In FIG. 2, in the case of CCE aggregation level 1, six PDCCH allocation region candidates (that is, each of CCE 16 to 21) are also set as UE-SS. In the case of CCE aggregation level 2, six PDCCH allocation region candidates (that is, CCE 6 to 17 are divided two by two) are set as UE-SS. In the case of CCE aggregation level 4, two PDCCH allocation region candidates (that is, CCE 20 to 23 and CCE 24 to 27) are set as UE-SS. In the case of CCE aggregation level 8, two PDCCH allocation region candidates (that is, CCE 16 to 23 and CCE 24 to 31) are set as UE-SS. That is, in FIG. 2, a total of sixteen PDCCH allocation region candidates are set as UE-SS.

Furthermore, for a terminal of "multi-antenna transmission mode," search space setting section 103 sets two subsets (UE-SS 1 and UE-SS 2) created by dividing UE-SS (UE-SS 0) set to each terminal.

That is, search space setting section 103 sets a subset group where UE-SS, which is set at a second transmission mode (here, for example, a transmission mode by transmit diversity defined in LTE) other than a first transmission mode (here, a multi-antenna transmission mode), is divided into the same number of submodes as those of a first transmission mode. As described above, since "multi-antenna transmission mode" has a first submode (a spatial multiplexing transmission mode of Rank 2 or more) and a second submode (a transmission mode of Rank 1), UE-SS (UE-SS 0) is divided into two subsets (UE-SS 1 and UE-SS 2) in here. The setting method of this subset will be described later in detail.

Search space setting section 103 outputs search space information indicating UE-SS of the set terminal, to allocation section 106.

PDCCH generating section 104 generates a PDCCH signal including allocation control information for data allocation of an individual terminal (that is, uplink resource allocation information per terminal, downlink resource allocation information, MCS information, and HARQ information or the like) input from control section 102, or a PDCCH signal including allocation control information for a common channel (that is, paging information and broadcast information that are common to terminals, or the like). In this case, PDCCH generating section 104 adds CRC bits to uplink allocation control information and downlink allocation control information generated per terminal, and further masks (or, scrambles) CRC bits by a terminal ID. Then, PDCCH generating section 104 outputs a PDCCH signal after masking to coding/modulating section 105.

After channel coding, coding/modulating section 105 modulates a PDCCH signal from PDCCH generating section 104 and outputs the modulated PDCCH signal to allocation section 106. Based on CQI (Channel Quality Indicator) information reported from each terminal, coding/modulating section 105 sets a coding rate so as to acquire efficient reception quality at each terminal. For example, coding/modulating section 105 sets a lower coding rate to terminal located nearer a cell edge (a terminal having lower channel quality).

Allocation section 106 allocates a PDCCH signal including allocation control information for a common channel, and a PDCCH signal including allocation control information for data allocation of an individual terminal for each terminal, the both PDCCH signals received from coding/modulating section 105, to CCE in UE-SS or CCE in UE-SS per terminal, the CCEs indicated by search space information received from search space setting section 103, respectively.

Here, allocation section 106 allocates allocation control information for a terminal of a multi-antenna transmission mode to CCE in UE-SS 1 in the case of DCI format 2C, and allocates allocation control information for a terminal of a multi-antenna transmission mode to CCE in UE-SS 2 in the case of DCI format 2D. That is, with respect to a plurality of submodes provided in a first transmission mode, allocation section 106 allocates different subsets from a subset group where UE-SS set by a second transmission mode (here, for example, a transmission mode by transmit diversity defined in LTE) other than a first transmission mode (here, a multi-antenna transmission mode) is divided.

The CCE aggregation levels in one PDCCH signal differ according to a coding rate and the number of PDCCH signal bits (that is, the amount of allocation control information). For example, since a coding rate of a PDCCH signal directed to a terminal located near a cell edge is set low, more physical resources are necessary. Therefore, allocation section 106 allocates the PDCCH signal directed to a terminal located near a cell edge to more CCEs.

For example, allocation section 106 selects one PDCCH allocation region candidate from a PDCCH allocation region candidate group in C-SS (for example, FIG. 2). Allocation section 106 allocates a PDCCH signal including allocation control information for a common channel, to CCE in the selected PDCCH allocation region candidate.

When allocation control information, which is designed for data allocation of an individual terminal and included in a PDCCH signal, is a DCI format (for example, DCIs 1, 2, 2A, 0A, and 0B) depending on a transmission mode, allocation section 106 selects one PDCCH allocation region candidate from a group of PDCCH allocation region candidates in UE-SS set to the destination terminal of the allocation control information.

In the case of a multi-user transmission mode, allocation section 106 selects one PDCCH allocation region candidate from a group of PDCCH allocation region candidates in UE-SS 1 when allocation control information for data allocation of an individual terminal is a format (DCI format 2C) associated with the above first submode, while selecting one PDCCH allocation region candidate from a group of PDCCH allocation region candidates in UE-SS 2 when allocation control information for data allocation of an individual terminal is a format (DCI format 2D) associated with the above second submode.

When allocation control information that is designed for data allocation of an individual terminal and included in a PDCCH signal is a format common to all terminals (for example, DCI 0/1A), allocation section 106 selects one PDCCH allocation region candidate from a group of PDCCH allocation region candidates in C-SS or a group of PDCCH allocation region candidates in UE-SS set to the destination terminal of the allocation control information.

Allocation section 106 outputs a PDCCH signal allocated to CCE, to multiplexing section 109. Allocation section 106 outputs the information indicating the CCE to which a PDCCH signal is allocated, to ACK/NACK reception section 120. Here, CCE allocation processing in allocation section 106 will be described later in detail.

After channel coding, coding/modulating section 107 modulates setting information from setting section 101 and outputs the modulated setting information to multiplexing section 109.

After channel coding, coding/modulating section 108 modulates transmission data received as input (downlink data) and outputs the modulated transmission data signal to multiplexing section 109.

Multiplexing section 109 multiplexes a PDCCH signal from allocation section 106, setting information from coding/modulating section 107, and a data signal (i.e. PDSCH signal) from coding/modulating section 108. Here, multiplexing section 109 maps a PDCCH signal and a data signal (PDSCH signal), based on downlink resource allocation information from control section 102. Here, multiplexing section 109 may map setting information to PDSCHs. Then, multiplexing section 109 outputs the multiplexed signal to IFFT section 110.

IFFT section 110 converts the multiplexed signal from multiplexing section 109 into a time waveform, and CP adding section 111 acquires an OFDM signal by adding a CP to this time waveform.

RF transmission section 112 performs transmission radio processing (such as up-conversion and a digital-to-analog (D/A) conversion) to an OFDM signal received from CP adding section 111, and transmits the result via antenna 113.

On the other hand, RF reception section 114 performs reception radio processing (such as a down-conversion and an analog-to-digital (A/D) conversion) to a radio signal received in a reception band through antenna 113, and outputs the resulting received signal to CP removing section 115.

CP removing section 115 removes the CP from the received signal, and FFT section 116 converts the received signal from which the CP has been removed, into a frequency domain signal.

Based on uplink resource allocation information from control section 102, extracting section 117 extracts uplink data from a frequency domain signal received from FFT section 116, and IDFT section 118 converts the extracted signal into a time domain signal and outputs the time domain signal to data reception section 119 and ACK/NACK reception section 120.

Data reception section 119 decodes the time domain signal received from IDFT section 118. Then, data reception section 119 outputs the decoded uplink data as reception data.

Among the time region signals received from IDFT section 118, ACK/NACK reception section 120 extracts an ACK/NACK signal from each terminal to downlink data (PDSCH signal). Specifically, ACK/NACK reception section 120 extracts the ACK/NACK signal from uplink control channel (for example, PUCCH (Physical Uplink Control Channel)), based on the information input from allocation section 106. Also, the uplink control channel is associated with CCE allocated to the downlink data.

ACK/NACK reception section 120 performs an ACK/NACK determination of the extracted ACK/NACK signal.

Here, in order to eliminate the need for signaling designed for reporting PUCCH from a base station to each terminal, the PUCCH used by a terminal for an ACK/NACK signal transmission; therefore, CCE and PUCCH are associated. By this means, it is possible to efficiently use downlink communication resource. Therefore, according to this association, each terminal determines PUCCH to be used for transmitting an ACK/NACK signal, based on CCE where control information (PDCCH signal) to terminal 200 is mapped.

[Terminal Configuration]

Figure 3:
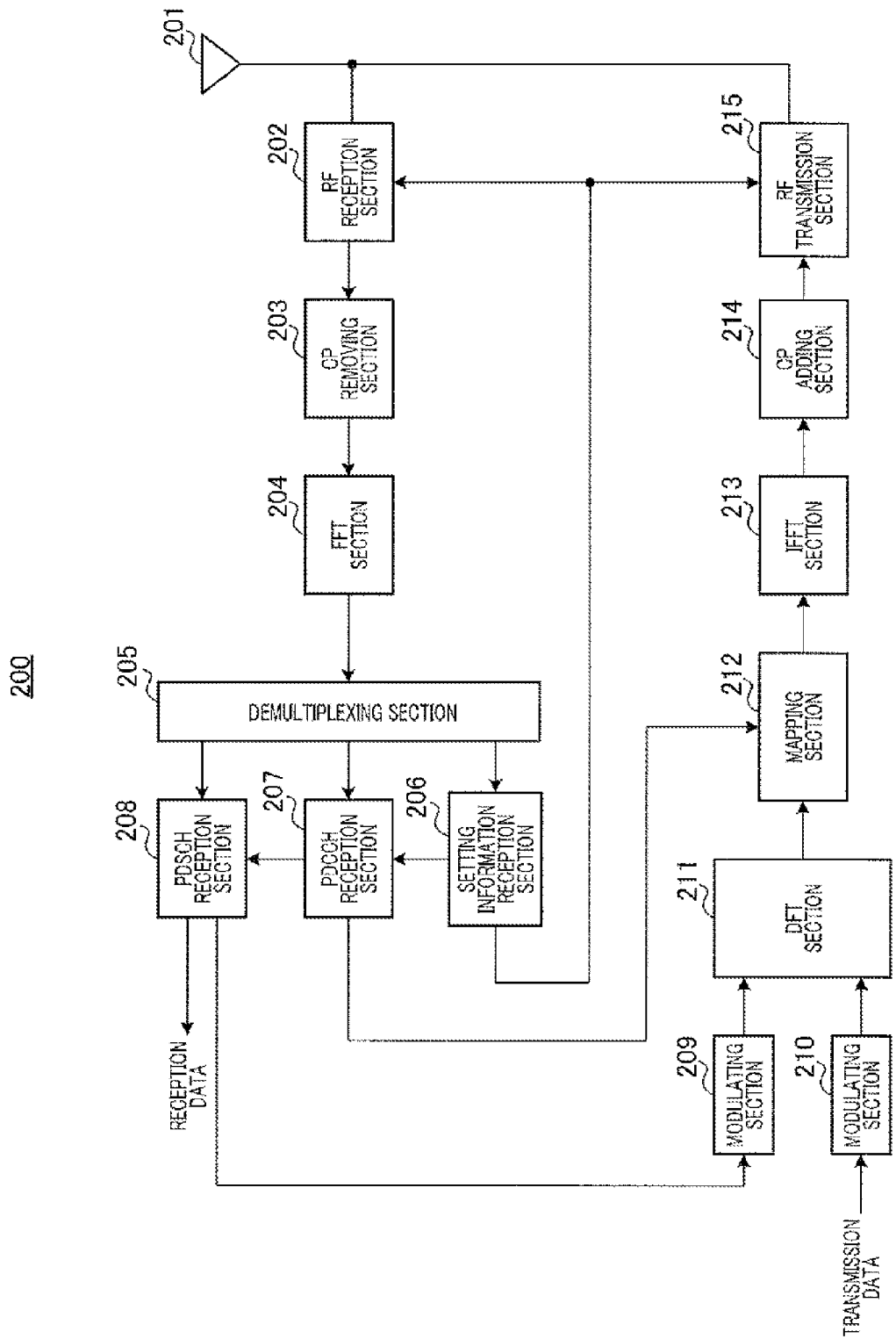
FIG. 3 is a block diagram showing a configuration of a terminal according to embodiment 1 of the present invention.

FIG. 3 is a block diagram showing a configuration of terminal 200 according to the present embodiment. Here, terminal 200 serves as an LTE-A terminal, receives a data signal (downlink data), and transmits an ACK/NACK signal for the data signal to base station 100 using PUCCH.

In FIG. 3, terminal 200 includes antenna 201, RF reception section 202, CP removing section 203, FFT section 204, demultiplexing section 205, setting information reception section 206, PDCCH reception section 207, PDSCH reception section 208, modulating sections 209 and 210, DFT section 211, mapping section 212, IFFT section 213, CP adding section 214, and RF transmission section 215.

RF reception section 202 sets a reception band, based on band information received from setting information reception section 206. Then, RF reception section 202 applies reception radio processing (such as down-conversion, analog-to-digital (A/D) conversion) to a radio signal (OFDM signal in here) received in the reception band via antenna 201, and outputs the resulting received signal to CP removing section 203. The received signal includes a PDSCH signal, a PDCCH signal, control information in a higher layer including setting information. A PDCCH signal (allocation control information) is allocated to a common search space (C-SS) set to terminal 200 or other terminal, or a UE specific search space (UE-SS) set to terminal 200.

CP removing section 203 removes the CP from the received signal, and FFT section 204 converts the received signal from which the CP has been removed, into a frequency domain signal. This frequency domain signal is output to demultiplexing section 205.

Demultiplexing section 205 demultiplexes the signal received from FFT section 204 into a higher layer control signal (e.g. RRC signaling or the like) including setting information, a PDCCH signal and a data signal (i.e. PDSCH signal). Then, demultiplexing section 205 outputs the control signal to setting information reception section 206, the PDCCH signal to PDCCH reception section 207, and a PDSCH signal to PDSCH reception section 208.

Setting information reception section 206 reads out information indicating a terminal ID set to terminal 200, from the control signal received from demultiplexing section 205, and outputs the read-out information to PDCCH reception section 207, as terminal ID information. Setting information reception section 206 reads out information indicating a transmission mode set to terminal 200 and outputs the read-out information to PDCCH reception section 207 as terminal mode information.

PDCCH reception section 207 acquires a PDCCH signal directed to terminal 200, by performing blind decoding (monitoring) on a PDCCH signal input from demultiplexing section 205. Here, PDCCH reception section 207 performs blind decoding on each of a DCI format (for example, DCI 0/1A) for data allocation common to all terminals, a DCI format (for example, DCIs 1, 2, 2A, 2C, 2D, 0A, and 0B) depending on a transmission mode set to terminal 200, and a DCI format (for example, DCIs 1C and 1A) for common channel allocation common to all terminals. By this means, a PDCCH signal including allocation control information of each DCI format is acquired.

Specifically, with respect to C-SS, PDCCH reception section 207 performs blind decoding on a DCI format (DCIs 1C and 1A) for common channel allocation and a DCI format (DCI 0/1A) for data allocation common to all terminals. That is, PDCCH reception section 207 demodulates and decodes each blind decoding region candidate (that is, a candidate in a CCE region allocated to terminal 200) in C-SS, targeting at a size of a DCI format for common channel allocation and a size of a DCI format for data allocation common to all terminals. PDCCH reception section 207 demasks a CRC bit by an ID that is common to a plurality of terminals, with respect to the decoded PDCCH signal. PDCCH reception section 207 determines that a PDCCH signal that has been resulted in CRC=OK (no error) as the result of demasking, as a PDCCH signal including allocation control information for a common channel. PDCCH reception section 207 demasks a CRC bit by the terminal ID of terminal 200 indicated by terminal ID information, with respect to the decoded PDCCH signal. As the result of demasking, PDCCH reception section 207 determines a PDCCH signal that is CRC=OK (no error) as the PDCCH signal including allocation control information for data allocation common to all terminals. That is, in C-SS, PDCCH reception section 207 distinguishes whether the allocation control information of DCI 0/1A is for common channel or for data allocation, by a terminal ID (a common ID to a plurality of terminals, or a terminal ID of terminal 200).

PDCCH reception section 207 calculates UE-SS of terminal 200 for each CCE aggregation level, by using a terminal ID of terminal 200 that the terminal ID information received from setting information reception section 206 indicates. PDCCH reception section 207 demodulates and decodes each blind decoding region candidate in the calculated UE-SS, targeting at a size of a DCI format associated with a transmission mode set to terminal 200 (transmission mode indicated in the transmission mode information) and a size of a DCI format (DCI 0/1A) common to all terminals.

Here, when a multi-antenna transmission mode is set, PDCCH reception section 207 demodulates and decodes two subsets (UE-SS 1 and UE-SS 2) in the calculated UE-SS, targeting at DCI format 2C and DCI format 2D. PDCCH reception section 207 demasks a CRC bit by a terminal ID of terminal 200, with respect to the decoded PDCCH signal. PDCCH reception section 207 decides that a PDCCH signal that has been resulted in CRC=OK (no error) as the result of demasking, as a PDCCH signal directed to terminal 200.

Then, PDCCH reception section 207 outputs downlink resource allocation information included in the PDCCH signal directed to terminal 200, to PDSCH reception section 208, and outputs uplink resource allocation information to mapping section 212. PDCCH reception section 207 also outputs a CCE number (in the case of a plurality of CCE aggregation levels, a CCE number of the first CCE) of CCE (CCE that is CRC=OK) where a PDCCH signal directed to terminal 200 is detected, to mapping section 212. Blind decoding (monitoring) processing in PDCCH reception section 207 in the case where a multi-antenna transmission mode is set will be described later in detail.

PDSCH reception section 208 extracts reception data (downlink data) from a PDSCH signal received from demultiplexing section 205, based on the downlink resource allocation information received from PDCCH reception section 207. PDSCH reception section 208 performs error detection to the extracted reception data (downlink data). As the result of the error detection, PDSCH reception section 208 generates a NACK signal as an ACK/NACK signal when there is an error in the reception data, and PDSCH reception section 208 generates an ACK signal as an ACK/NACK signal when there is no error in the reception data. This ACK/NACK signal is output to modulating section 209.

Modulating section 209 modulates the ACK/NACK signal received from PDSCH reception section 208, and outputs the modulated ACK/NACK signal to DFT section 211.

Modulating section 210 modulates transmission data (uplink data), and outputs the modulated data signal to DFT section 211.

DFT section 211 transforms the ACK/NACK signal received from modulating section 209 and the data signal received from modulating section 210 into a frequency domain, and outputs the resulting plurality of frequency components to mapping section 212.

Among a plurality of frequency components received from DFT section 211, mapping section 212 maps the frequency component equivalent to a data signal to PUSCH, according to uplink resource allocation information received from PDCCH reception section 207. Mapping section 212 specifies PUCCH according to a CCE number received from PDCCH reception section 207. Among a plurality of frequency components input from DFT section 211, mapping section 212 maps the frequency component or code resource equivalent to an ACK/NACK signal, to the above specified PUCCH.

IFFT section 213 transforms the plurality of frequency components mapped to PUSCH and PUCCH into a time domain waveform, and CP adding section 214 adds a CP to this time-domain waveform.

RF transmission section 215 is formed to be able to change a transmission band. RF transmission section 215 sets the transmission band, based on band information received from setting information reception section 206. Then, RF transmission section 215 performs transmission radio processing (such as up-conversion and digital-to-analog (D/A) conversion) to a signal to which CP adding section 214 adds a CP, and transmits the result via antenna 201.

[Operations of Base Station 100 and Terminal 200]
<Search Space Configuration by Base Station 100>

Search space setting section 103 sets a common search space (C-SS) and a UE specific search space (UE-SS).

Figure 4:
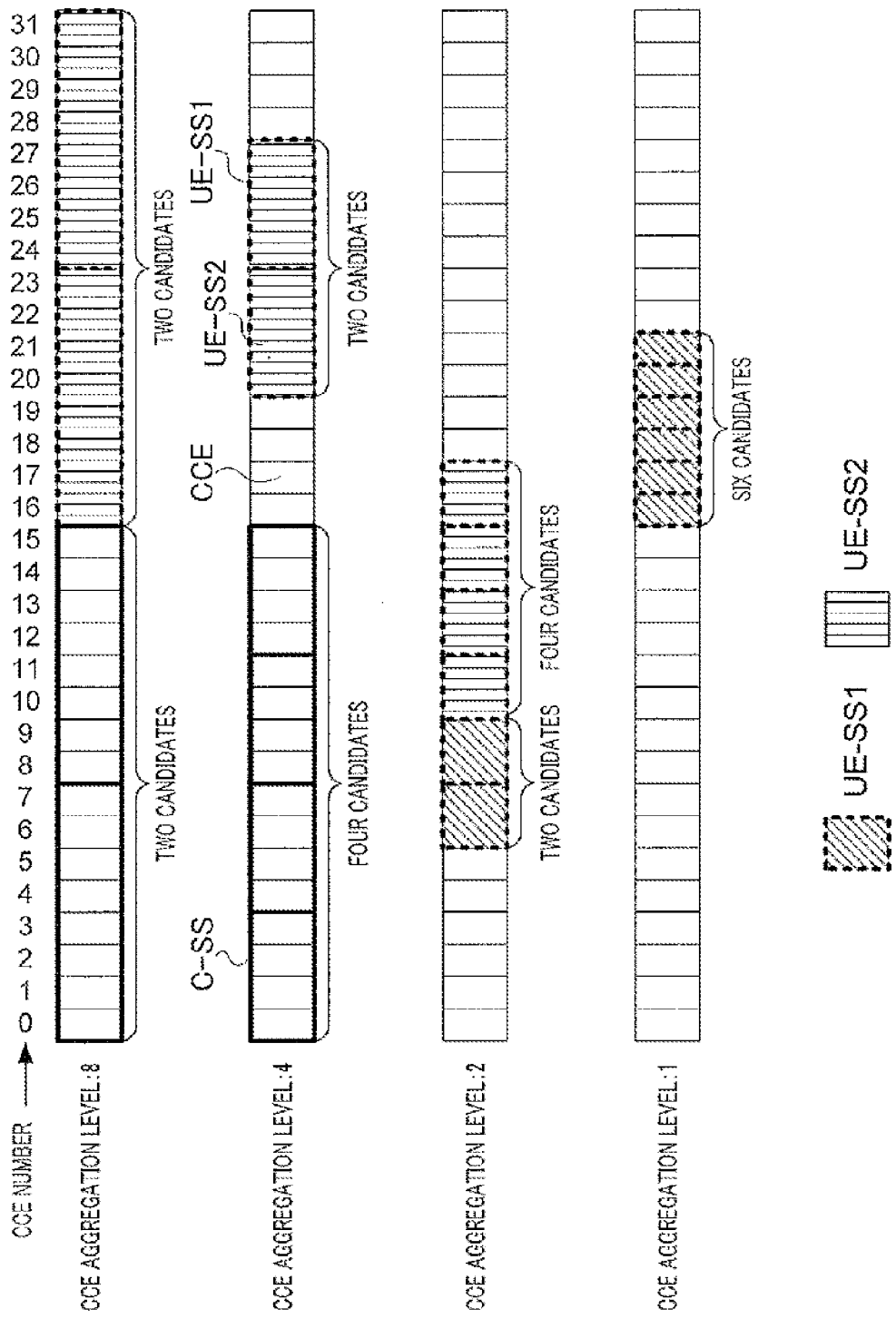
FIG. 4 shows configuration examples of search spaces according to embodiment 1.

In a search space configuration example shown in FIG. 4, as in FIG. 2, in the case of CCE aggregation level 4 of PDCCH, four PDCCH allocation region candidates (that is, CCE 0 to 3, CCE 4 to 7, CCE 8 to 11, and CCE 12 to 15) are set as C-SS. In the case of CCE aggregation level 8 of PDCCH, two PDCCH allocation region candidates (that is, CCE 0 to 7 and CCE 8 to 15) are set as C-SS. This configuration is based on a search space standardized in LTE.

In a search space configuration example shown in FIG. 4, as in FIG. 2, in the case of CCE aggregation level 1, six PDCCH allocation region candidates (that is, each of CCE 16 to 21) are also set as UE-SS. In the case of CCE aggregation level 2, six PDCCH allocation region candidates (that is, CCE 6 to 17 are divided two by two) are set as UE-SS. In the case of CCE aggregation level 4, two PDCCH allocation region candidates (that is, CCE 20 to 23 and CCE 24 to 27) are set as UE-SS. In the case of CCE aggregation level 8, two PDCCH allocation region candidates (that is, CCE 16 to 23 and CCE 24 to 31) are set as UE-SS.

Furthermore, in a search space configuration example shown in FIG. 4, in UE-SS, there is set a subset (UE-SS 1) having six PDCCH allocation region candidates in the case of CCE aggregation level 1 and two PDCCH allocation region candidates in the case of CCE aggregation level 2, and there is set a subset (UE-SS 2) having four PDCCH allocation region candidates in the case of CCE aggregation level 2, two PDCCH allocation region candidates in the case of CCE aggregation level 4, and two PDCCH allocation region candidates in the case of CCE aggregation level 8.

That is, when assuming CCE aggregation level 2 as a standard level, a PDCCH allocation region candidate group associated with a CCE aggregation level that is fewer than the standard level is allocated to UE-SS 1, and a PDCCH allocation region candidate group associated with a CCE aggregation level that is greater than the standard level is allocated to UE-SS 2. A PDCCH allocation region candidate group associated with CCE aggregation level 2 that is a standard level is distributed into UE-SS 1 and UE-SS 2. In FIG. 4, especially, among six PDCCH allocation region candidates associated with CCE aggregation level 2, two of the candidates are distributed to UE-SS 1 and the remaining four candidates are distributed to UE-SS 2. That is, in CCE aggregation level 2 that is a standard level, more PDCCH allocation region candidates are allocated to UE-SS 2 than UE-SS 1.

<Resource Allocation Processing to Downlink Control Information by Base Station 100>

Allocation section 106 allocates a PDCCH allocation region candidate in a search space to a PDCCH signal received from coding/modulating section 105 and including downlink control information.

Figure 5:
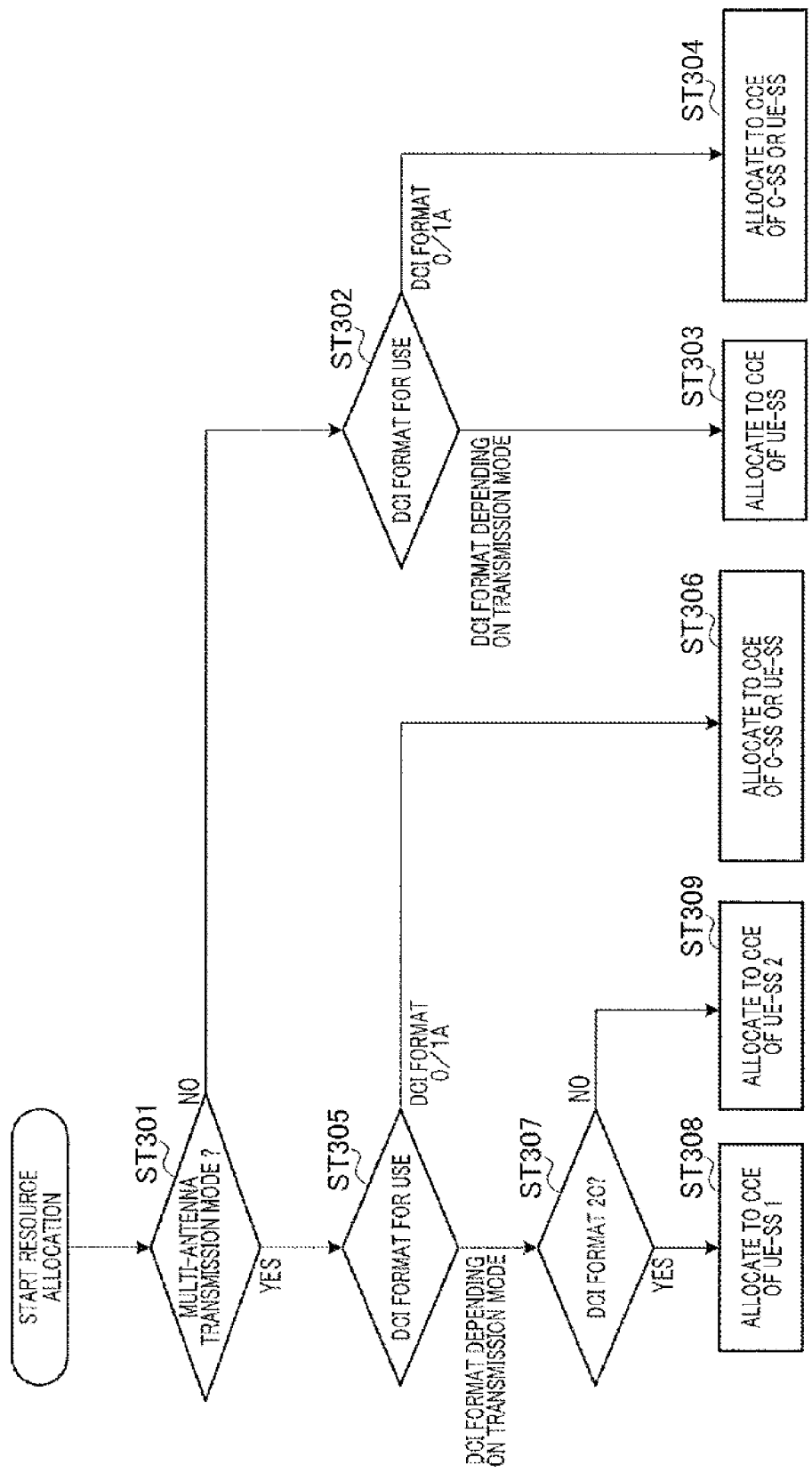
FIG. 5 is a flowchart for explaining resource allocation processing for downlink control information by an allocation section.

FIG. 5 is a flowchart explaining resource allocation processing to downlink control information to each terminal by allocation section 106.

In step ST301, allocation section 106 determines whether or not a format of allocation control information included in a PDCCH signal is the format of a multi-antenna transmission mode (that is, a transmission mode having a subband).

When a format of allocation control information included in a PDCCH signal is not the format of a multi-antenna transmission mode (step ST301: NO), in step ST302, allocation section 106 determines whether the format is the DCI format depending on a transmission mode or the format common to all terminals (DCI 0/1A).

When it is determined in step ST302 that a format is the DCI format depending on a transmission mode, allocation section 106 allocates one PDCCH allocation region candidate of a PDCCH allocation region candidate group included in UE-SS, with respect to the allocation control information, in step ST303.

When a format is determined in step ST302 as the format (DCI 0/1A) common to all terminals, allocation section 106 allocates one PDCCH allocation region candidate of C-SS or UE-SS PDCCH allocation region candidate groups, to the allocation control information in step ST304.

When a format of allocation control information included in a PDCCH signal is the format of a multi-antenna transmission mode (step ST301: YES), allocation section 106 determines whether the format is the DCI format depending on a transmission mode or the format (DCI 0/1A) common to all terminals, in step ST305.

When a format is determined in step ST305 as the format (DCI 0/1A) common to all terminals, allocation section 106 allocates one PDCCH allocation region candidate of C-SS or UE-SS PDCCH allocation region candidate groups, to the allocation control information in step ST306.

When a format is determined in step ST305 as the DCI format depending on a transmission mode, allocation section 106 determines whether or not the format is DCI format 2C in step ST307.

When a format is determined in step ST307 as DCI format 2C, allocation section 106 allocates one PDCCH allocation region candidate of a PDCCH allocation region candidate group included in UE-SS 1 to the allocation control information in step ST308.

When a format is determined as not DCI format 2C in step ST307, that is, when the format is DCI format 2D, allocation section 106 allocates one PDCCH allocation region candidate of a PDCCH allocation region candidate group in UE-SS 2 to the allocation control information in step ST309.

As described above, a downlink control signal is mapped to a resource according to a DCI format and is transmitted from base station 100 to a terminal.

<Reception Processing by Terminal 200>

Terminal 200 performs blind decoding on C-SS and UE-SS.

Specifically, PDCCH reception section 207 of terminal 200 performs blind decoding on all blind decoding region candidates included in C-SS. This blind decoding is performed on allocation control information (DCIs 1C and 1A) for a common channel and allocation control information (DCI 0/1A) for data allocation common to all terminals.

When a multi-antenna transmission mode is not set, that is, when a DCI format depending on a transmission mode is one type (or, one type for each uplink and downlink), a blind decoding attempt is performed on all blind decoding region candidates included in UE-SS. This blind decoding is performed on a DCI format (for example, DCI format 1) set according to a transmission mode and allocation control information for data allocation common to all terminals (DCI 0/1A).

Here, when a multi-antenna transmission mode is set, PDCCH reception section 207 performs blind decoding only on a subset based on a transmission submode. That is, as for DCI format 2C, PDCCH reception section 207 performs blind decoding only on a blind decoding region candidate of UE-SS 1, and as for DCI format 2D; PDCCH reception section 207 performs blind decoding only on a blind decoding region candidate of UE-SS 2. Thus, since a subset where DCI format 2C and DCI format 2D are arranged is demultiplexed, it is possible to reduce the number of blind decoding attempts.

According to the above described present embodiment, in bases station 100, search space setting section 103 sets a subset group where UE-SS, which is set at second transmission mode other than a first transmission mode, is divided into the same number of submodes as those of a first transmission mode, and allocation section 106 allocates different subsets to a plurality of submodes provided in a first transmission mode.

By this means, since a blind decoding region candidate related to a DCI format associated with each submode can be limited to a subset associated with each submode, it is possible to reduce the number of blind decoding attempts in terminal 200. Since UE-SS set at a second transmission mode is not uniformly reduced, it is possible to prevent the increase of a block rate. That is, since UE-SS 1 and UE-SS 2 are not overlapped with each other, and the total number of PDCCH allocation region candidates becomes the same as those of UE-SS set at a second transmission mode, it is possible to prevent the increase of a block rate of PDCCH transmission with respect to a terminal of a multi-antenna transmission mode.

Particularly, in the present embodiment, a first transmission mode is a multi-antenna transmission mode, a first submode is a spatial multiplexing transmission mode of Rank 2 or more, and a second submode is a transmission mode of Rank 1.

Therefore, it is possible to dynamically switch a DCI format according to CoMP and MIMO transmission methods (Rank 1, and Rank 2 or more), without increasing the number of blind decoding attempts in terminal 200.

Figure 6:
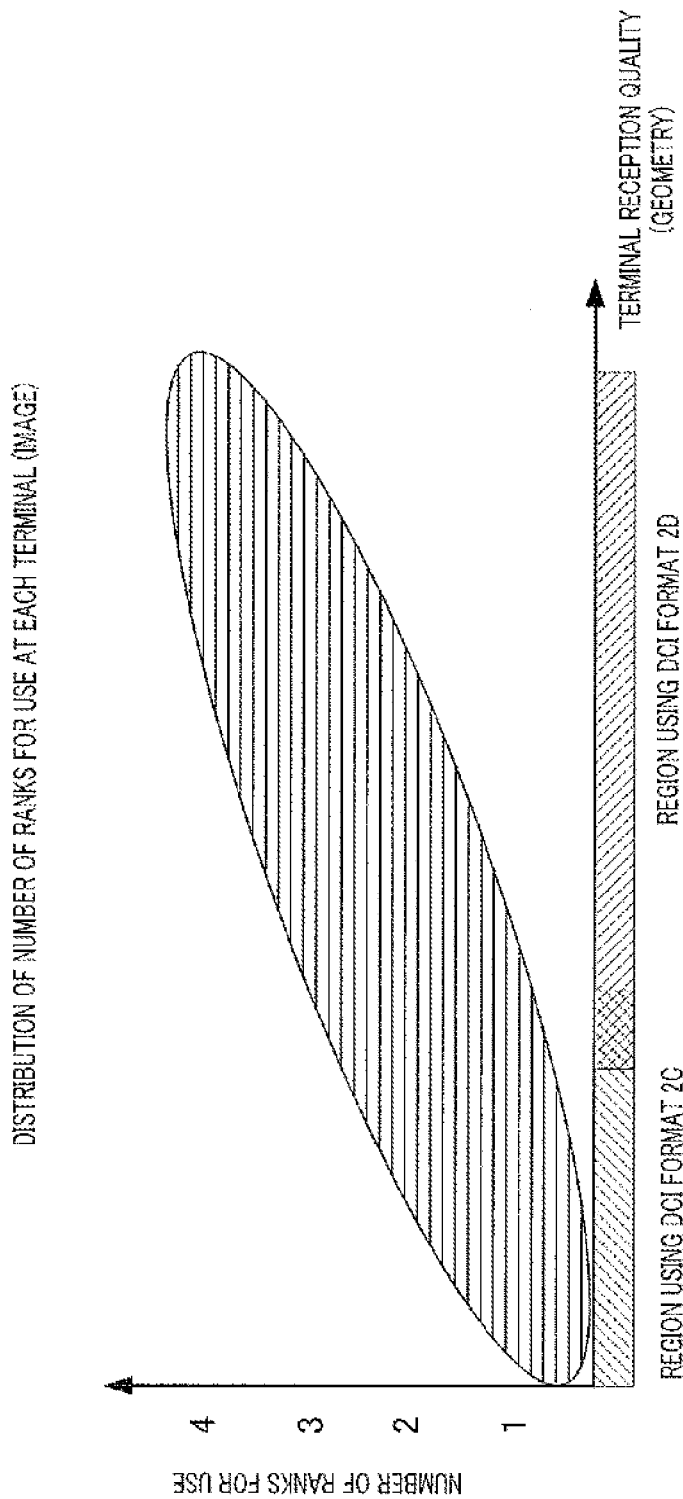
FIG. 6 shows a relationship between reception quality of a terminal and the number of ranks easily used.

By using a DCI format according to channel condition, it is possible to perform more efficient control information transmission. Generally, in a transmission method of Rank 2 or more, it is necessary to perform spatial demultiplexing precisely on a received signal. Therefore, the transmission method of Rank 2 or more is mainly applied to a terminal (such as the one located in the cell center) having good condition of the propagation paths (reception quality such as path loss, received power, and SINR). Meanwhile, the transmission method of Rank 1 is mainly applied to a terminal (such as the one near the cell edge) having bad condition of the propagation paths. In the transmission method of Rank 2 or more, CQI information reported from a terminal to a base station becomes a large amount of information. Therefore, in terms of uplink efficiency, the transmission method of Rank 2 or more is not suitable to be applied for a terminal near the cell edge. Therefore, the relationship between reception quality of a terminal and the number of Ranks easily used becomes as shown in FIG. 6. That is, as the reception quality of a terminal is improved, the number of Ranks to be used becomes greater. Therefore, DCI format 2C is used in the case of lower reception quality, and DCI format 2D is used in the case of higher reception quality.

In the present embodiment, a PDCCH allocation region candidate group associated with a CCE aggregation level that is fewer than the standard level is allocated to a subset associated with a first submode, and a PDCCH allocation region candidate group associated with a CCE aggregation level that is greater than the standard level is allocated to a subset associated with a second submode. That is, more PDCCH allocation region candidate groups having a higher coding rate, which requires a higher SINR, are allocated to a subset associated with a first submode, and more PDCCH allocation region candidate groups having a low coding rate, which is capable of performing reception at a lower SINR, are allocated to a subset associated with a second submode.

By this means, it is possible to sufficiently increase the number of PDCCH allocation region candidates of a CCE aggregation level easily used in each DCI format. That is, in both DCI format 2C and 2D, the CCE allocation flexibility increases in the CCE aggregation level easily used. Therefore, it is possible to reduce a block rate.

FIG. 7 shows coding rates associated with CCE aggregation levels to DCI format 2C and DCI format 2D (two and four antennas). FIG. 7 shows coding rates associated with CCE aggregation levels when the system bandwidth is 5 MHz, 10 MHz, and 20 MHz, respectively. In FIG. 7, DCI format 2C is described as "single-rank DCI," and DCI format 2D is described as "superset DCI."

As is clear from FIG. 7, since coding rates are equal to or higher than 0.6 when a CCE aggregation level is 1, there is a low possibility that DCI format 2D is used. Since coding rates are equal to or lower than 0.25 when CCE aggregation levels are 4 and 8, there is a low possibility that DCI format 2C is used. Therefore, the influence on the system is low without supporting DCI format 2C when CCE aggregation levels are 4 and 8, and DCI format 2D when a CCE aggregation level is 1.

Figure 8:
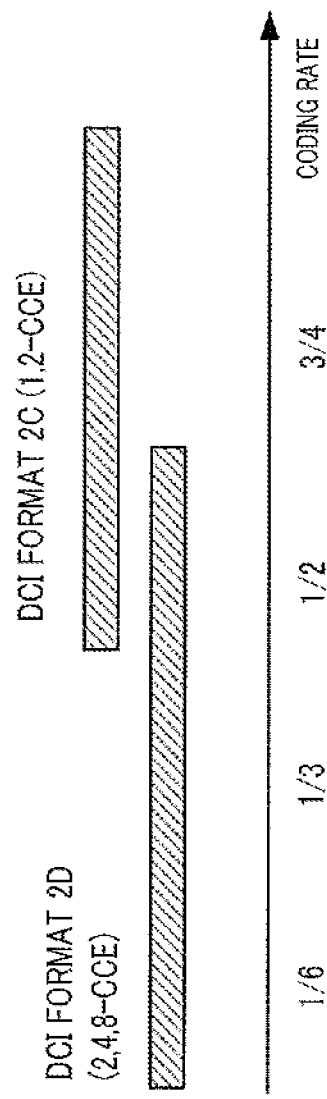
FIG. 8 shows coding rates supported by DCI format 2C and DCI format 2D.

FIG. 8 shows coding rates that DCI format 2C and DCI format 2D support. As shown in FIG. 8, DCI format 2C and DCI format 2D can cover from a high coding rate to a low coding rate. That is, the subset groups associate with DCI format 2C and DCI format 2D can cover from a high coding rate to a low coding rate. Therefore, it is possible to use a multi-antenna transmission mode with respect to any terminal in a cell.

UE-SS is the same as the one determined in LTE. For setting each divided UE-SS as a subset, terminal 200 may perform blind decoding to the same blind decoding region candidate as in the case of DCI format 0/1A. Therefore, the design of terminal 200 becomes simplified. When UE-SS in LTE from a terminal ID and so forth is calculated, a subset is also implicitly calculated. Therefore, it is not necessary to set a new search space, and thereby allowing simplification of base station 100 and terminal 200.

In the above description, in the case of CCE aggregation level 2, the first two PDCCH allocation region candidates in UE-SS are set as UE-SS 1, and the last four PDCCH allocation region candidates are set as UE-SS 2. However, it is not limited to this, and the last two PDCCH allocation region candidates may be set as UE-SS 1, and the first four PDCCH allocation region candidates may be set as UE-SS 2. Also, UE-SS 1 and UE-SS 2 may be discontinuous. In the discontinuous case, it is possible to reduce a PDCCH block rate.

(Embodiment 2)

Embodiment 2 relates to a variation of subset configuration in a UE specific search space.

Figure 9:
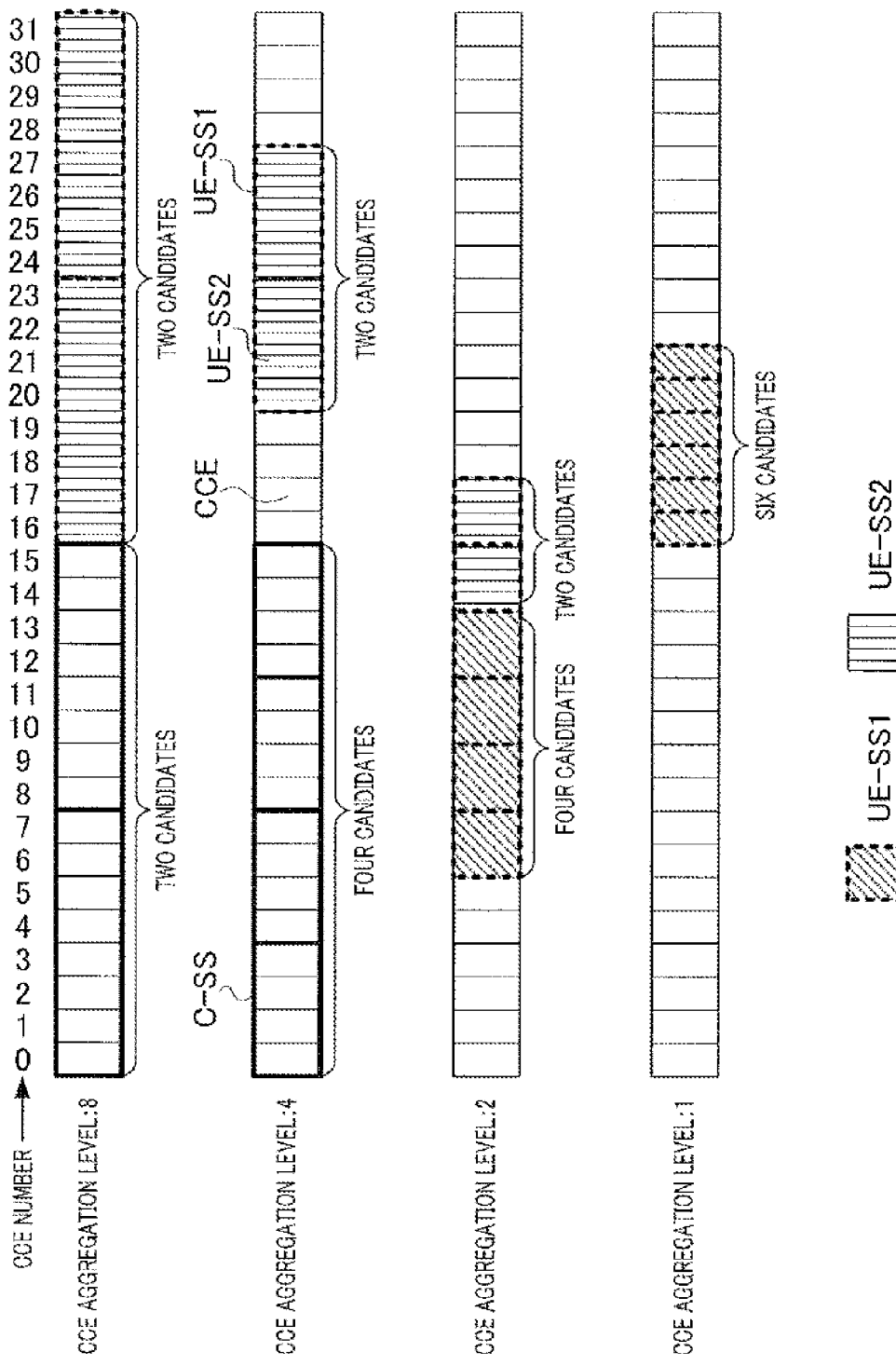
FIG. 9 shows configuration examples of search spaces according to embodiment 2.

In a search space configuration example shown in FIG. 9, in UE-SS, there is set a subset (UE-SS 1) having six PDCCH allocation region candidates in the case of CCE aggregation level 1 and four PDCCH allocation region candidates in the case of CCE aggregation level 2, and there is set a subset (UE-SS 2) having two PDCCH allocation region candidates in the case of CCE aggregation level 2, two PDCCH allocation region candidates in the case of CCE aggregation level 4, and two PDCCH allocation region candidates in the case of CCE aggregation level 8.

That is, since a search space configuration example shown in FIG. 9 sets CCE aggregation level 2 as the standard level as in FIG. 4, a PDCCH allocation region candidate group associated with a CCE aggregation level fewer than the standard level is allocated to UE-SS 1, and a PDCCH allocation region candidate group associated with a CCE aggregation level greater than the standard level is allocated to UE-SS 2. The PDCCH allocation region candidate group associated with CCE aggregation level 2 that is a standard level is distributed to UE-SS 1 and UE-SS 2.

In FIG. 9, especially, among six PDCCH allocation region candidates associated with CCE aggregation level 2, four of the candidates are distributed to UE-SS 1 and the remaining two candidates are distributed to UE-SS 2. That is, in CCE aggregation level 2 that is a standard level, more PDCCH allocation region candidates are allocated to UE-SS 1 than UE-SS 2. Thus, the total number of PDCCH allocation region candidates results in ten UE-SS 1 (six candidates of CCE aggregation levels 1 and four candidates of CCE aggregation levels 2), and six UE-SS 2 (two candidates of CCE aggregation levels 2, two candidates of CCE aggregation levels 4, and two candidates of CCE aggregation levels 8). That is, UE-SS 1 has a greater number of PDCCH allocation region candidates.

Here, a PDCCH allocation region candidate group of UE-SS 1 is allocated to DCI format 2C, and a PDCCH allocation region candidate group of UE-SS 2 is allocated to DCI format 2D. DCI formal 2C is used in allocation for Rank 2 or more, and further may designate Rank 1 by setting one of transport blocks as disabled. That is, DCI format 2C supports all Ranks, so that it is frequently used. Meanwhile, DCI format 2D supports only Rank 1, so that it is often used supplementarily when the condition of the propagation paths is deteriorated. Therefore, DCI format 2D is not used frequently.

By this means, since a search space configuration shown in FIG. 9 can allocate more PDCCH allocation region candidates to a DCI format that is used more frequently, it is possible to reduce a rate that blocks PDCCH allocation to terminals of Ranks that are more present.

In CCE aggregation level 2 that is a standard level, among six PDCCH allocation region candidates, three of the candidates may be allocated to UE-SS 1 and the remaining three candidates may be allocated to UE-SS 2.

(Embodiment 3)

Embodiment 3 relates to a variation of subset configuration in a UE specific search space.

According to a cell environment, the configuration example of embodiment 3 makes a PDCCH allocation region candidate included in both UE-SS 1 and UE-SS 2 configurable. However, the total number of PDCCH allocation region candidates included in UE-SS 1 and UE-SS 2 are fixed.

For example, since a small cell such as a hot spot and a femto cell accommodates only a small number of terminals, it is possible that there is sufficient amount of PDCCH resource to manage the number of PDCCHs that need to be allocated to terminals in each subframe. Also a small distance between a terminal and a base station in a small cell, which leads to many terminals having good reception quality. Therefore, in a small cell, allocation section 106 sets more PDCCH allocation region candidates to UE-SS 1 associated with DCI format 2C capable of supporting all Ranks with a large payload size.

On the other hand, since a large cell such as a macro cell accommodates a large number of terminals targeted for PDCCH allocation in each subframe, or it is possible that a large number of terminals having bad reception quality are present. Therefore, in a large cell, allocation section 106 sets more PDCCH allocation region candidates to UE-SS 2 associated with DCI format 2D having a smaller payload size.

For example, in configuration 1 for a small cell, UE-SS 1 includes six and four PDCCH allocation region candidates, and zero and zero PDCCH allocation region candidate (that is, a total of ten PDCCH allocation region candidates) with respect to CCE aggregation levels 1, 2, 4, and 8, respectively, and UE-SS 2 includes zero PDCCH allocation region candidate, and two, two, and two PDCCH allocation region candidates (that is, a total of six PDCCH allocation region candidates) with respect to CCE aggregation levels 1, 2, 4, and 8, respectively.

For example, in configuration 2 for a large cell, UE-SS 1 includes four and two PDCCH allocation region candidates, and zero and zero PDCCH allocation region candidate (that is, a total of six PDCCH allocation region candidates) with respect to CCE aggregation levels 1, 2, 4, and 8, respectively, and UE-SS 2 includes two, four, two, and two PDCCH allocation region candidates (that is, a total of ten PDCCH allocation region candidates) with respect to CCE aggregation levels 1, 2, 4, and 8, respectively.

The information relates to whether configuration 1 or configuration 2 will be used is reported to terminals as the broadcast information in a cell.

Also, in a default configuration, UE-SS 1 and UE-SS 2 include the same number of PDCCH allocation region candidates. For example, as in embodiment 1, UE-SS 1 includes six and two PDCCH allocation region candidates, and zero and zero PDCCH allocation region candidate (that is, a total of eight PDCCH allocation region candidates) with respect to CCE aggregation levels 1, 2, 4, and 8, respectively, and UE-SS 2 includes zero PDCCH allocation region candidate, and four, two, and two PDCCH allocation region candidates (that is, a total of eight PDCCH allocation region candidates) with respect to CCE aggregation levels 1, 2, 4, and 8, respectively.

Generally, this default configuration may be used, and for a special case the above described configuration 1 or 2 may be used. When configuration 1 or 2 is used, the information related to the configuration to be used may be reported to terminals as the broadcast information in a cell. Alternatively, the information may be reported individually per terminal. This information is necessary only for terminals using multi-antenna transmission modes, and therefore individual reporting may require fewer radio resources compared to broadcasting to the entire cell, according to the number of terminals using multi-antenna transmission modes.

According to the above described present embodiment, allocation section 106 includes a plurality of UE-SS configurations, and selects a subset which includes a large number of PDCCH allocation region candidates and is associated with a frequently used DCI format according to a cell environment. By this means, it is possible to allocate an appropriate number of PDCCH allocation region candidates to a subset associated with a frequently used DCI format, and it is therefore possible to reduce a rate that blocks PDCCH allocation to terminals.

(Embodiment 4)

Embodiment 4 relates to a variation of a subset configuration in a UE specific search space.

In the configuration example in embodiment 4, all PDCCH allocation region candidates associated with a CCE aggregation level that is a standard level is allocated to any one of subsets. That is, PDCCH allocation region candidates of different CCE aggregation levels are set at a plurality of submodes, respectively. For example, in a configuration example in embodiment 4, UE-SS 1 includes six and six PDCCH allocation region candidates, and zero and zero PDCCH allocation region candidate (that is, a total of twelve PDCCH allocation region candidates) with respect to CCE aggregation levels 1, 2, 4, and 8, respectively, and UE-SS 2 includes zero and zero PDCCH allocation region candidate, and two and two PDCCH allocation region candidates (that is, a total of four PDCCH allocation region candidates) with respect to CCE aggregation levels 1, 2, 4, and 8, respectively. That is, all six PDCCH allocation region candidates in CCE aggregation level 2 that is a standard level are distributed to UE-SS 1.

Here, during CoMP transmission that a plurality of base stations perform data transmission in a coordinated manner, PDCCH is transmitted only from one cell while data is transmitted by a plurality of base stations in a coordinated manner. Therefore, the reception quality of PDCCH may be deteriorated as compared with data. Therefore, DCI format 2D having a smaller payload size is mainly used. For this reason, during CoMP transmission, it is possible that DCI format 2D is frequently used in CCE aggregation levels 4 or 8 that can realize a lower coding rate. That is, there is a high possibility that a terminal does not receive DCI format 2D with sufficient reception quality, in CCE aggregation levels 1 and 2 having higher coding rates. Therefore, even though DCI format 2D is made to support only CCE aggregation levels 4 and 8, the possibility to block PDCCH allocation will not increase.

It is possible to improve the PDCCH block rate of the whole system, by setting more number of candidates to DCI format 2C frequently used.

Since the DCI format capable of performing allocation for each CCE aggregation level is determined one-to-one, it is possible to simplify the processing of allocation section 106. Since terminal 200 only needs to set the DCI format for blind decoding for each CCE aggregation level, it is also possible to simplify the processing of terminal 200.

(Embodiment 5)

Embodiment 5 relates to a variation of a subset configuration in a UE specific search space.

The configuration example in embodiment 5 changes the number of PDCCH allocation region candidates of each CCE aggregation level according to a bandwidth. The bandwidth is reported to terminals through broadcast information.

Here, in a component band (component carrier) with wideband (for example, 10 MHz and 20 MHz), DCI format 2C has more number of bits for resource (RB) allocation report (allocation report by a bitmap). For this reason, when DCI format 2C is CCE aggregation level 1, the coding rate increases too much (R=0.8 or more). Therefore, a terminal using DCI format 2C is limited to the terminal that is located in the cell center and having the flat frequency-selective fading.

Meanwhile, in a component band (component carrier) with a narrow band (for example, 5 MHz), DCI format 2C easily uses CCE aggregation level 1 (R=about 0.75). FIG. 7 also indicates the above description.

For this reason, the present embodiment changes the number of PDCCH allocation region candidates of each CCE aggregation level according to a bandwidth.

For example, when a bandwidth of a component band used to communicate between base station 100 and terminal 200 is less than 10 MHz (50 RB), UE-SS 1 includes six and two PDCCH allocation region candidates, and zero and zero PDCCH allocation region candidate with respect to CCE aggregation levels 1, 2, 4, and 8, respectively, and when the bandwidth is equal to or higher than 10 MHz (50 RB), UE-SS 1 includes two and six PDCCH allocation region candidates, and zero and zero PDCCH allocation region candidate with respect to CCE aggregation levels 1, 2, 4, and 8, respectively.

On the other hand, DCI format 2D performs a RB allocation report, according to starting RB and the length. Therefore, the number of bits of DCI format 2D is not much different according to bandwidths. Therefore, in any bandwidth, UE-SS 2 includes zero PDCCH allocation region candidate, and four, two, and two PDCCH allocation region candidates with respect to CCE aggregation levels 1, 2, 4, and 8, respectively.

By this means, since UE-SS 1 can increase the number of PDCCH allocation region candidates of a CCE aggregation level frequently used, according to a bandwidth of a component band, it is therefore possible to reduce a rate that blocks PDCCH allocation.

(Other Embodiments)

(1) "Multi-antenna transmission mode" used in the above embodiments means the transmission mode to support a multi-layer transmission introduced for LTE-A (Rel 10), and is different from a MIMO mode such as transmission modes 3 and 4 in LTE (Rel 8).

Other than DCI 0/1A, a multi-antenna transmission mode has been described in the above as a transmission mode to monitor two DCI formats according to a downlink transmission mode. However, the present invention is not limited to this, and as long as a transmission mode performs monitoring a plurality of DCI formats according to a transmission mode, a transmission mode other than a multi-antenna transmission mode may be possible. A multi-antenna transmission mode may be a transmission mode using a reference signal for demodulation of an individual terminal (demodulation reference signal or UE specific reference signal).

(2) The above embodiments have described a format capable of reporting spatial multiplexing transmission of Rank 2 or more as DCI format 2C, and a format capable of reporting spatial multiplexing transmission of only Rank 1 as DCI format 2D.

However, the present invention is applicable when a terminal monitors a DCI format depending on a plurality of transmission modes. By this means, without increasing the number of blind decoding attempts, it is possible to provide an effect to dynamically switch a transmission mode or a submode of the transmission mode, while using the same search space that of LTE.

Furthermore, when there are a plurality of formats to report different transmission methods and the range of reception quality (such as, path loss, geometry, SINR, reception power, and SNR) that becomes an operation region of each transmission method differs, the application of the present invention may increase the number of PDCCH allocation region candidates of the subset associated with a frequently used DCI format according to reception quality of a terminal. By this means, it is possible to allocate an appropriate number of PDCCH allocation region candidates for the subset associated with a frequently used DCI format, thereby to reduce a rate that blocks PDCCH allocation to terminals.

(3) The above embodiments have described the case to monitor two DCI formats as a DCI format depending on a transmission mode. However, the present invention is not limited to this and also applicable when monitoring three or more DCI formats as the DCI format depending on a transmission mode.

(4) The above embodiments have described a format capable of reporting spatial, multiplexing transmission of Rank 2 or more as DCI format 2C, and a format capable of reporting spatial multiplexing transmission of only Rank 1 as DCI format 2D. However, the present invention is not limited to this, and may be a DCI format associated with other different transmission mode or transmission method. For example, in a CoMP transmission, a joint processing (JP) mode and a coordinated scheduling (CS) mode are possible, the joint processing (JP) mode for performing data transmission from a plurality of base stations, and the coordinated scheduling (CS) mode for performing data transmission from one base station even though scheduling is performed between a plurality of base stations in a coordinated manner. That is, the JP mode and the CS mode can be captured as submodes of a CoMP transmission mode. In any submode, PDCCH is transmitted from one base station. In the case where these submodes are switched dynamically, it is possible to obtain the same effect as the above description by using different DCI formats for each submode. That is, since a JP mode is the mode that a terminal receives signals from a plurality of cells, the JP mode is used for a terminal that is located near the cell edge and has bad PDCCH reception quality. Therefore, as in the case of DCI format 2D, a DCI format for the JP mode may only support a greater CCE aggregation level. According to this, a DCI format for CS supports only a fewer CCE aggregation level.

(5) The above embodiments have described assuming that one component band (component carrier) is used between base station 100 and terminal 200. However, the present invention is not limited to this, and may be applied during the operation of a carrier aggregation using a plurality of component bands (component carriers). That is, the above embodiments are applicable to each component band.

(6) As for a terminal ID in the above embodiments, C-RNTI (Cell-Radio Network Temporary Identifier) may be used.

(7) The expression of "a DCI format common to all terminals" in the above embodiments may be read as "a DCI format not depending on a transmission mode."

(8) Although the above embodiments have described the format not depending on a terminal transmission mode as DCI 0/1A, the above embodiments are not limited to this and any format used without depending on the terminal transmission mode may be possible.

As a DCI depending on a transmission mode, a format other than DCIs 1, 2, 2A, 2B, 2C, 2D, 0A, and 0B may be used.

Also, as a transmission mode of uplink or downlink, consecutive bands allocation transmission may be included. In a terminal where this transmission mode is set, DCIs depending on a transmission mode become DCI 0 (uplink) and DCI 1A (downlink). In this case, since the DCI format common to all terminals is the same as the format depending on a transmission mode, UE-SS may perform blind decoding on one kind of format as a target in uplink and downlink. In the case of consecutive bands allocation transmission in uplink and downlink, the format is one kind in total.

It is possible to prevent an increase in a block rate for a terminal where PDCCH is allocated only by DCI 0/1A due to the poor condition of propagation paths, by setting DCI 0/1A to DCI depending on a transmission mode with a wider search space.

(9) In the above embodiment (paragraph 52), UE-SS set using a second transmission mode (here, for example, a transmission mode according to transmit diversity defined in LTE) other than a first transmission mode (here, a multi-antenna transmission mode) is adapted to set a subset group that is divided into the same number of submodes as those provided in a first transmission mode. The present invention is not limited to this, and UE-SS set for a DCI format (here, DCI format 0/1A) for a data allocation common to all terminals may set a subset group that is divided into the same number of the submodes as those provided in a transmission mode. Here, for example, a multi-antenna transmission mode includes two submodes and a transmit diversity mode includes one submode.

(10) In the above embodiments 1 to 3, or 5, only in CCE aggregation level 2 that is a standard level, the search space is divided into UE-SS 1 and UE-SS 2. The present invention is not limited to this, the search space may be divide into UE-SS 1 and UE-SS 2, also in CCE aggregation levels other than CCE aggregation level 2 that is a standard level. The same effect as the present invention can be acquired by setting fewer UE-SS 1 (that is, more UE-SS 2) to more CCE aggregation levels and more UE-SS 1 (that is, fewer UE-SS 1) to fewer CCE aggregation levels.

(11) Although the above embodiments have been described to be applicable to an antenna, the present invention is equally applicable to an antenna port.

An antenna port means a logical antenna formed by one or multiple physical antennas. Thus, an antenna port is not limited to represent one physical antenna, and may be for example an array antenna formed by multiple antennas.

For example, 3GPP LTE does not define the number of physical antennas for forming an antenna port, but defines an antenna port as a minimum unit for transmitting different reference signals from a base station.

In addition, an antenna port may be defined as a minimum unit to multiply weighting of a precoding vector.

(12) The above embodiments have mentioned an example when the present invention is performed by hardware, but the present invention can be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be regenerated is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2009-286655, filed on Dec. 17, 2009, including the specification, drawings and abstract, is incorporated herein by reference in its entirety.

Industrial Applicability

A radio transmitting apparatus and control signal transmission method of the present invention is useful as an apparatus being capable of reducing the number of blind decoding attempts at a receiving side, without increasing an allocation block rate of a control signal.

REFERENCE SIGNS LIST

100 Base station
101 Setting section
102 Control section
103 Search space setting section
104 PDCCH generating section
105, 107, 108 Coding/modulating section
106 Allocation section
109 Multiplexing section
110, 213 IFFT section
111, 214 CP adding section
112, 215 RF transmission section
113, 201 Antenna
114, 202 RF reception section
115, 203 CP removing section
116, 204 FFT section
117 Extracting section
118 IDFT section
119 Data reception section
120 ACK/NACK reception section
200 Terminal
205 Demultiplexing section
206 Setting information reception section
207 PDCCH reception section
208 PDSCH reception section
209, 210 Modulating section
211 DFT section
212 Mapping section

The invention claimed is:

1. A radio transmitting apparatus that transmits a control signal by arranging the control signal in one allocation region candidate of a plurality of allocation region candidates provided in a search space, the radio transmitting apparatus comprising: a transmission mode setting section for setting either a first transmission mode having a plurality of submodes or a second transmission mode; a search space setting section for setting a UE specific search space for each receiving apparatus where the first transmission mode is set, and dividing the UE specific search space into a plurality of control channel element (CCE) subsets according to CCE aggregation level; and an allocation section for allocating the plurality of CCE subsets to downlink control information (DCI) formats corresponding to the plurality of submodes, respectively; wherein: the allocation region candidate is formed by one standard unit or by connecting a plurality of standard units; and the search space setting section sets the allocation region candidate associated with a fewer CCE aggregation level than a predetermined CCE aggregation level to a first CCE subset out of the plurality of subsets, and the allocation region candidate associated with a greater CCE aggregation level than the predetermined CCE aggregation level to a second CCE subset.

2. The radio transmitting apparatus according to claim 1, wherein the search space setting section makes the number of the allocation region candidates included in a first CCE subset greater than the number of the allocation region candidates included in a second CCE subset.

3. The radio transmitting apparatus according to claim 1, wherein the search space setting section changes the number of allocation region candidates included in each of the CCE subsets according to a communication environment.

4. The radio transmitting apparatus according to claim 1, wherein:
the allocation region candidate is formed by one standard unit or by connecting a plurality of standard units; and
the search space setting section sets all allocation region candidates associated with any CCE aggregation level to one CCE subset.

5. The radio transmitting apparatus according to claim 1, wherein the search space setting section changes the number of allocation region candidates included in each of the CCE subsets according to a bandwidth of a transmission band of the control signal.

6. The radio transmitting apparatus according to claim 1, wherein:
the radio transmitting apparatus is an LTE-A base station;
the first transmission mode is a multi-antenna transmission mode;
the second transmission mode is a transmission mode by transmit diversity in LTE;
the plurality of submodes includes a first submode that is a spatial multiplexing transmission mode of Rank 2 or more and a second submode that is a transmission mode of Rank 1; and
the allocation section sets a first CCE subset to a first DCI format corresponding to the first submode, and sets a second CCE subset to a second DCI format corresponding to the second submode.

7. A control signal transmission method that transmits a control signal by arranging the control signal in one allocation region candidate of a plurality of allocation region candidates provided in a search space, the control signal transmission method comprising: setting either a first transmission mode having a plurality of submodes or a second transmission mode; setting a UE specific search space for each receiving apparatus where the first transmission mode is set, and dividing the UE specific search space into a plurality of control channel element (CCE) subsets according to CCE aggregation level; and allocating the plurality of CCE subsets to downlink control information (DCI) formats corresponding to the plurality of submodes, respectively; wherein: the allocation region candidate is formed by one standard unit or by connecting a plurality of standard units; and the search space setting section sets the allocation region candidate associated with a fewer CCE aggregation level than a predetermined CCE aggregation level to a first CCE subset out of the plurality of subsets, and the allocation region candidate associated with a greater CCE aggregation level than the predetermined CCE aggregation level to a second CCE subset.

* * * * *